United States Patent [19]
Shaffer et al.

[11] 3,950,462
[45] Apr. 13, 1976

[54] METHOD FOR MAKING A RESILIENT STORAGE INSERT

[75] Inventors: Clifford K. Shaffer, Westfield; Joe B. Weiss, Indianapolis, both of Ind.

[73] Assignee: The United States of America as represented by the Secretary of the Navy, Washington, D.C.

[22] Filed: June 19, 1975

[21] Appl. No.: 588,527

[52] U.S. Cl. ............... 264/46.8; 264/46.6; 264/225
[51] Int. Cl.² ...................... B29D 9/00; B29D 5/00
[58] Field of Search ........ 264/46.4, 46.6, 46.8, 225; 425/175, 383

[56] References Cited
UNITED STATES PATENTS

| | | |
|---|---|---|
| 2,948,651 | 8/1960 | Waas .......................... 264/46.4 X |
| 3,390,214 | 6/1968 | Woods ........................... 264/46.8 |

*Primary Examiner*—Othell M. Simpson
*Assistant Examiner*—Leon Gilden
*Attorney, Agent, or Firm*—R. S. Sciascia; Paul S. Collignon

[57] ABSTRACT

A method of making a resilient storage insert for holding fragile components comprising the steps of first vacuum forming a sheet of flexible acrylonitrile butadiene styrene in a male die and then placing said vacuum-formed sheet in a female die, then filling the underside of said vacuum-formed sheet with polyurethane foam material and then curing said polyurethane foam material.

5 Claims, 3 Drawing Figures

METHOD FOR MAKING A RESILIENT STORAGE INSERT

BACKGROUND OF THE INVENTION

The present invention relates to a method for making a resilient storage insert and more particularly to a method for making plastic items in small production lots.

Items which are made of plastic are relatively inexpensive, yet require a substantial capital investment in dies and tools. When very large production lots are made, the capital investment is spread over a large number of units and may amount to only a fraction of a cent. On the other hand, when only a few hundred items are needed, the capital investment for dies and tools, which might be thousand of dollars, prohibits economical manufacture of plastic items.

SUMMARY OF THE INVENTION

The present invention relates to a method for making plastic items, such as resilient storage inserts, and is particularly suitable for making short production runs of plastic items. A relatively inexpensive male die of wood or metal is first made to provide the desired shape of the product to be produced and then a female die is produced by heat and vacuum forming a sheet of rigid plastic material such as rigid acrylonitrile butadiene styrene (ABS). Next a sheet of flexible plastic material, such as flexible acrylonitrile butadiene styrene is vacuum-formed on the same male die and then the flexible sheet is fitted into the rigid sheet to provide temporary rigidity to the flexible sheet. Next polyurethane foam of a two component liquid system is poured into the backside or bottom of the flexible sheet and the polyurethane foam is cured. The sheet of rigid material is then removed and can be used again providing temporary rigidity to another sheet of flexible material.

It is therefore a general object of the present invention to provide a method for molding plastic items which method is economically suitable for short production runs.

Other objects, advantages and novel features of the invention will become apparent from the following detailed description of the invention when considered in conjunction with the accompanying drawing.

DESCRIPTION OF THE PREFERRED EMBODIMENT

Figure 1:
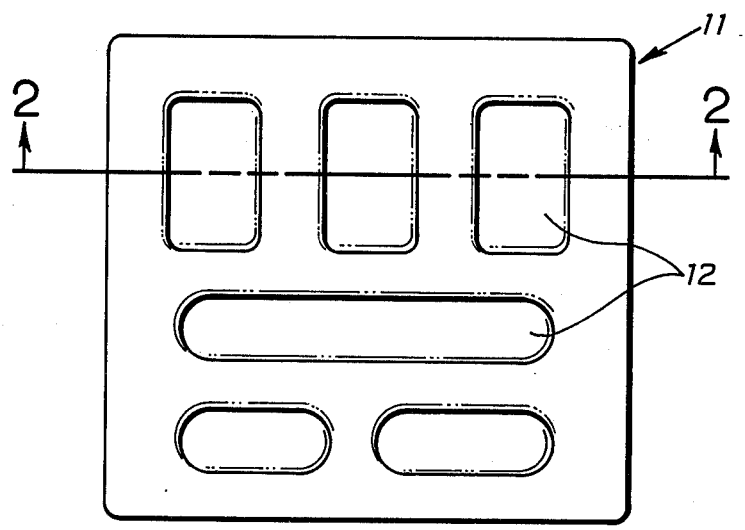
FIG. 1 is a top plan view of a resilient storage insert made by the method of the present invention.
Figure 2:
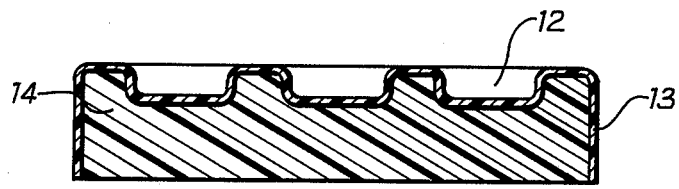
FIG. 2 is a sectional view taken on line 202 of FIG. 1.

Referring first to FIGS. 1 and 2 of the drawing, there is shown a resilient storage insert 11 which is designed to fit into a drawer, such as a tool chest. Various sizes and shapes of cavities 12 are provided in insert 11 to accommodate different sizes of items to be carried, such as tools, electrical components, and the like. Cavities 12 maintain the various items in one position and prevent their contacting one another. Insert 11 is comprised of a sheet of flexible plastic material 13, which has cavities 12 vacuum-formed therein, and a cured polyurethane material 14, which has been foamed-in-place, is provided beneath the sheet of flexible plastic material 13 to provide the desired rigidity to the flexible plastic material.

Figure 3:
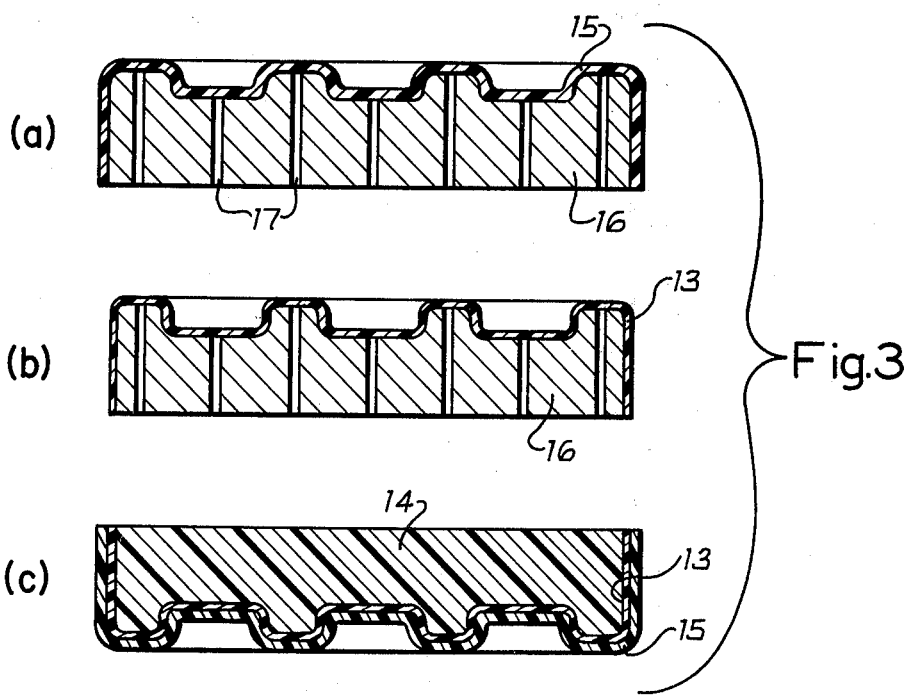
FIG. 3 is a diagrammatic sectional view showing the various steps in making the item shown in FIG. 1.

Referring now to FIG. 3 of the drawing, there is shown in FIG. 3(a), a sheet of rigid plastic material 15, such as rigid acrylonitrile butadiene styrene, being vacuum-formed on a male die 16 having a plurality of holes 17 for removing air. In FIG. 3(b) of the drawing, the same male die 16 is shown in use for vacuum-forming a sheet of flexible plastic material 13, such as flexible acrylonitrile butadiene styrene. By way of example, the rigid acrylonitrile butadiene styrene sheet might be purchased from the Uniroyal Plastic Products Division of Uniroyal, Inc., Warsaw, Ind. 46580, and is sold under the tradename of "Royalite 20". Likewise, the flexible acrylonitrile butadiene styrene might be purchased from the same company and is sold under the tradename of "Royalite 54".

After the sheet of rigid plastic material 15 is removed from die 16 it is inverted, as shown in FIG. 3(c) and then the sheet of flexible plastic material 13, after removal from die 16, is fitted into the inside of the formed sheet of rigid plastic material. A polyurethane foam 14, which is furnished as a two-component liquid system, is then poured into the mold formed by the sheet of flexible plastic material 13. The polyurethane foam material is then allowed to cure for 1 to 4 hours and then the material 13 with the foam 14 therein, is removed from the rigid plastic material 15. The cured foam material provides rigidity to the soft flexible plastic material, yet delicate components can be placed in cavities 12 and are cushioned by the soft flexible plastic material 13.

OPERATION

In operation, a sheet of rigid acrylonitrile butadiene styrene 15 is placed on die 16 and heated to a temperature of between 280° and 300° F. At this elevated temperature the sheet of rigid acrylonitrile butadiene styrene becomes soft and pliable and is ready for forming. A vacuum is then pulled on die 16 and the pliable plastic material is formed to the shape of the die. By way of example, this forming can be done on an Abbott Vacuum Forming Machine which is manufactured and sold by the Abbott Machinery Division, U.S. Packaging Corp., Greenville, S.C. 29607. After forming, the plastic material 15 is cooled while still on die 16 and again becomes rigid. If desired, air and a water spray can be used to expedite cooling. The rigid plastic is then removed from die 16.

The same die 16 is then used to form a sheet of flexible acrylonitrile butadiene styrene 13. The flexible sheet 13 is heated to a temperature of between 280° and 300° F., and then a vacuum is drawn on die 16. Sheet 13 then is formed to die 16 and, after cooling, sheet 13 is removed from die 16. The cavities 12, which are shown in FIGS. 1 and 2 of the drawing, are formed, however, sheet 13 is very flexible and not capable of supporting any heavy objects. Sheet 13 is next placed within rigid sheet 15, as shown in FIG. 3(c) and, while so assembled, polyurethane foam 14 is poured into the cavities formed by sheet 13. By way of example, foam 14 might be a two-component liquid foam-in-place system. One component is comprised of isocyanate compounds and the other component is comprised of polyol compound, as more fully described in Military Specification Mil-P-26514D, dated 10 July 1974. After curing the polyurethane foam at ambient temperature for about 1 hour, sheet 13 can be removed from rigid sheet 15.

The insert 11, which is shown in FIGS. 1 and 2 of the drawing, is designed to fit within a drawer so that delicate components can be stored. It should be understood, however, that the present method can be used to make various shapes and sizes of containers and that they need not be used as inserts.

Obviously many modifications and variations of the present invention are possible in the light of the above teachings. It is therefore to be understood that within the scope of the appended claims the invention may be practiced otherwise than as specifically described.

We claim:

1. A method for making a resilient storage insert comprising, die forming a sheet of rigid plastic material into a rigid container and then using the same die to form a sheet of flexible plastic material into a shape similar to said rigid container, then positioning said sheet of flexible plastic material into said rigid container to provide a container of flexible plastic material, then filling said container of flexible plastic material with a liquid foam material and curing said liquid foam material into a solid material which is the underside of a resilient storage insert, and then removing said resilient storage insert from said rigid container.

2. A method for making a resilient storage insert as set forth in claim 1 wherein said sheet of rigid plastic material is rigid acrylonitrile butadiene styrene and is heated to a temperature between 280° and 300° F. prior to forming.

3. A method for making a resilient storage insert as set forth in claim 1 wherein said sheet of flexible plastic material is flexible acrylonitrile butadiene styrene and is heated to a temperature between 280° and 300° F. prior to forming.

4. A method for making a resilient storage insert as set forth in claim 1 wherein said sheet of rigid plastic material is rigid acrylonitrile butadiene styrene and is heated to a temperature between 280° and 300° F. prior to forming and said sheet of flexible plastic material is flexible acrylonitrile butadiene styrene and is heated to a temperature between 280° and 300° F.

5. A method for making a resilient storage insert as set forth in claim 1 wherein said liquid foam material is a two-component polyurethane foam-in-place system.

* * * * *